(12) United States Patent
Malpani et al.

(10) Patent No.: US 9,753,949 B1
(45) Date of Patent: Sep. 5, 2017

(54) REGION-SPECIFIC IMAGE DOWNLOAD PROBABILITY MODELING

(71) Applicant: Shutterstock, Inc., New York, NY (US)

(72) Inventors: Vaibhav Malpani, Jersey City, NJ (US); Nathan Hurst, Seattle, WA (US)

(73) Assignee: SHUTTERSTOCK, INC., New York, NY (US)

( * ) Notice: Subject to any disclaimer, the term of this patent is extended or adjusted under 35 U.S.C. 154(b) by 12 days.

(21) Appl. No.: 15/069,246

(22) Filed: Mar. 14, 2016

(51) Int. Cl.
| | |
|---|---|
| G06K 9/54 | (2006.01) |
| G06K 9/60 | (2006.01) |
| G06F 17/30 | (2006.01) |
| G06K 9/66 | (2006.01) |

(52) U.S. Cl.
CPC .... G06F 17/30256 (2013.01); G06F 17/3053 (2013.01); G06F 17/3056 (2013.01); G06F 17/30528 (2013.01); G06F 17/30554 (2013.01); G06K 9/66 (2013.01)

(58) Field of Classification Search
CPC ......... G06F 17/30256; G06F 17/30528; G06F 17/3053; G06F 17/30554; G06F 17/3056; G06K 9/66
See application file for complete search history.

(56) References Cited

U.S. PATENT DOCUMENTS

| | | | |
|---|---|---|---|
| 9,305,088 B1* | 4/2016 | Zamir | G06F 17/30864 |
| 2012/0084731 A1* | 4/2012 | Filman | G06F 17/3028 |
| | | | 715/838 |
| 2015/0370830 A1* | 12/2015 | Murphy-Chutorian | G06F 17/30256 |
| | | | 707/748 |
| 2016/0358024 A1* | 12/2016 | Krishnakumar | G06K 9/00684 |
| 2017/0091189 A1* | 3/2017 | Kang | G06F 17/3053 |

FOREIGN PATENT DOCUMENTS

CN 103593474 A 2/2014

OTHER PUBLICATIONS

Krizhevsky, et al.m, "ImageNet Classification with Deep Convolutional Neural Networks," 2012, retrieved from http://papers.nips.cc/paper/4824-imagenet-classification-with-deep-convolutional-neural-networks.
Szegedy, et al., "Going Deeper with Convolutions," Sep. 2014, retrieved from http://arxiv.org/abs/1409.4842.
Vedaldi, et al., "VGG Convolutional Neural Networks Practical," 2015, retrieved from http://www.robots.ox.ac.uk/~vgg/practicals/cnn/.

* cited by examiner

*Primary Examiner* — David F Dunphy
(74) *Attorney, Agent, or Firm* — McDermott Will & Emery LLP

(57) ABSTRACT

Methods for prioritizing a set of images identified as responsive to an image search query from a user based on features of the images identified as relevant to a geographic region of the user are provided. In one aspect, the method includes submitting a plurality of images to a computer-operated convolutional neural network that is configured to analyze image pixel data for each of the plurality of images to identify features, in each of the plurality of images, influencing a download probability of the corresponding image in a plurality of geographic regions. The method also includes receiving, from the neural network and for each of the plurality of images, a download probability of each image for each of the plurality of geographic regions. Systems and machine-readable media are also provided.

18 Claims, 12 Drawing Sheets

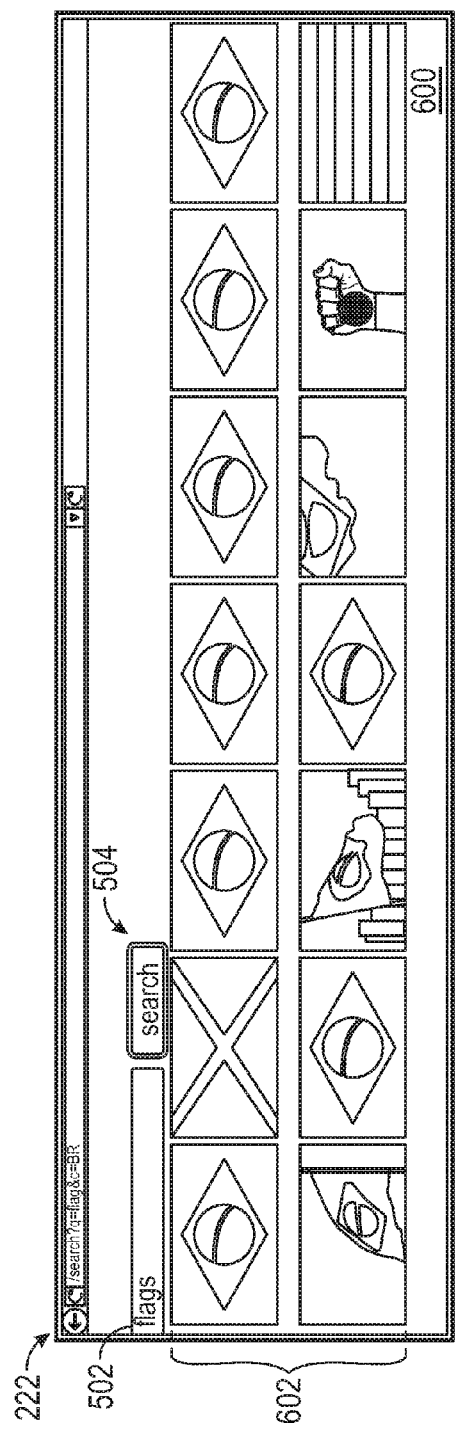
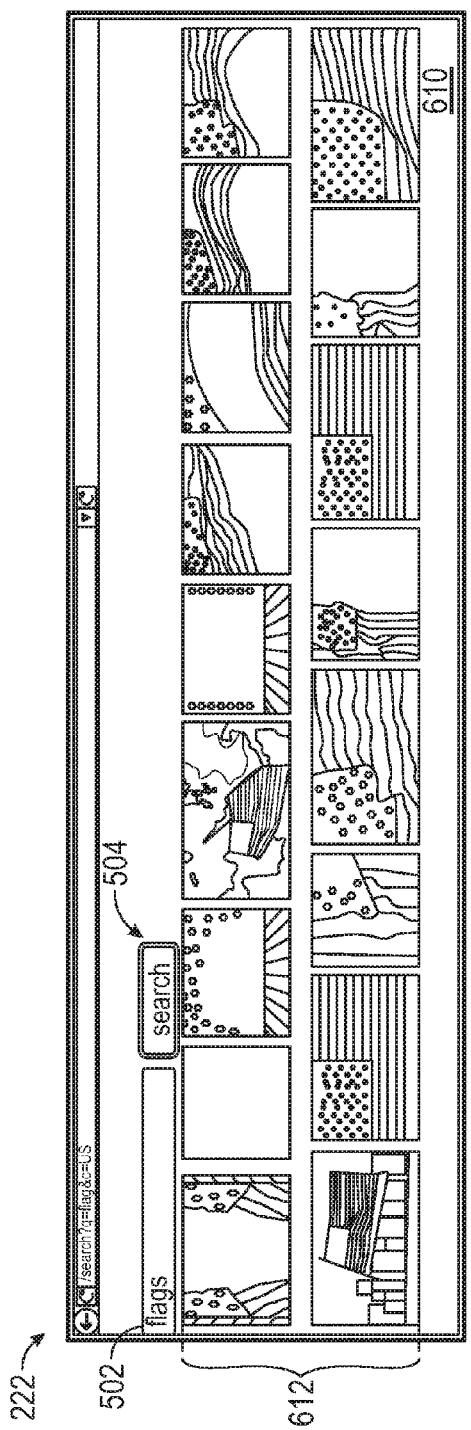
FIG. 6A
FIG. 6B

REGION-SPECIFIC IMAGE DOWNLOAD PROBABILITY MODELING

BACKGROUND

Field

The present disclosure generally relates to training a computer-based neural network to identify features in images that affect likelihood of download of those images in different geographical regions.

Description of the Related Art

Online content repositories commonly provide users with the ability to search for and access content in the repositories. For example, for an online image content repository with a large volume of images, a user that seeks to search for a particular image of football may enter the query "football" into a search interface for the online image content repository. What the user intends by the query "football" will depend heavily on the geographic region from which the user submits the query. Specifically, a user using a device identified as being located in the United States or Canada that enters "football" will likely be searching for images related to the sport more particularly known as American football, while a user using a device identified as being located in Brazil will likely be searching for images related to the sport referred to in the United States as soccer. Such differences may also occur more subtly for other image searches, such as for the search query "cats", for which a user using a device identified as being located in the United States and a user using a device identified as being located in Japan may have very different image results in mind when conducting the search.

SUMMARY

The disclosed system provides for identifying image search results responsive to a submitted user query for images, and providing those search results to a computer-operated neural network that is configured to analyze image pixel data for the images to identify features relevant in the images for specific geographic regions. The neural network provides, for each image, a probability of download value for one or many geographic regions, and the image search results are then prioritized according to the probability of download value for the geographic region of the user. In certain aspects, the computer-operated neural network is trained in a two-step process. The first step is to train the neural network with a first set of training images so that the neural network can learn to identify generic features in images. The second step is to further train the neural network with a second set of training images with associated data identifying how many times those images were downloaded in particular geographic regions (e.g., 90% of users that download a particular image were located in Japan).

According to one embodiment of the present disclosure, a computer-implemented method is provided for prioritizing a set of images identified as responsive to an image search query from a user based on features of the images identified as relevant to a geographic region of the user. The method includes submitting a plurality of images to a computer-operated convolutional neural network that is configured to analyze image pixel data for each of the plurality of images to identify features, in each of the plurality of images, influencing a download probability of the corresponding image in a plurality of geographic regions. The method also includes receiving, from the neural network and for each of the plurality of images, a download probability of each image for each of the plurality of geographic regions.

In certain aspects, the method further includes receiving a user input from a user in one of the plurality of geographic regions comprising a search query for a collection of images, submitting a search request comprising the search query to a search engine for the collection of images, receiving an identification of the plurality of images from the collection of images that are responsive to the search query, and providing a listing of the plurality of images that is prioritized according to the one of the plurality of geographic regions of the user. In these aspects, the method can also include providing a first set of training images to the convolutional neural network, wherein upon processing the first set of training images the convolutional neural network is configured to identify features from an image by analyzing pixel data of the image, and providing a second set of training images to the convolutional neural network and regional download data identifying a number of downloads of each of the second set of training images in each of the plurality of geographic regions, wherein upon processing the second set of training images and the regional download data the convolutional neural network is configured to analyze image pixel data for each of the plurality of images to identify features, in each of the plurality of images, influencing the download probability of the corresponding image in the plurality of geographic regions. In these aspects, the providing the first set of training images and the providing the second set of training images can occur prior to the receiving the user input comprising the search query and prior to the submitting the plurality of images to the computer-operated convolutional neural network. In these aspects, the method can further include providing, to the convolutional neural network with the plurality of images, information about images previously downloaded by the user, wherein the download probability of each image includes a download probability that is specific to the user and based on the one of the plurality of geographic regions of the user and the information about images previously downloaded by the user.

In certain aspects the method further includes receiving a user input from a user in one of the plurality of geographic regions comprising a search query for the plurality of images, submitting a search request comprising the search query to a search engine for the plurality of images, receiving an identification of a subset of the plurality of images from the collection of images that are responsive to the search query, identifying the download probabilities for the subset of the plurality of images from the download probabilities for the plurality of images, and providing a listing of the subset of the plurality of images that is prioritized according to the one of the plurality of geographic regions of the user. In certain aspects, the method further includes providing to the convolutional neural network an image that does not have associated regional download data identifying a number of downloads of the image in a geographic region, and receiving from the convolutional neural network, a download probability of the image for each of the plurality of geographic regions. In certain aspects, the convolutional neural network includes one of AlexNet, GoogLeNet, or a Visual Geometry Group convolutional neural network.

According to one embodiment of the present disclosure, a system is provided for prioritizing a set of images identified as responsive to an image search query from a user based on features of the images identified as relevant to a geographic region of the user. The system includes a memory that includes a first set of training images, a second set of training images, regional download data identifying a number of downloads of each of the second set of training images in each of the plurality of geographic regions, and a computer-operated convolutional neural network. The system also includes a processor configured to provide the first set of training images to the convolutional neural network, wherein upon processing the first set of training images the convolutional neural network is configured to identify features from an image by analyzing pixel data of the image, and provide the second set of training images to the convolutional neural network and the regional download data identifying a number of downloads of each of the second set of training images in each of the plurality of geographic regions, wherein upon processing the second set of training images and the regional download data the convolutional neural network is configured to analyze image pixel data for each of a plurality of images to identify features, in each of the plurality of images, influencing download probability of the corresponding image in the plurality of geographic regions. The processor is also configured to submit the plurality of images to the convolutional neural network, and receive, from the neural network and for each of the plurality of images, a download probability of each image for each of the plurality of geographic regions.

In certain aspects of the system, the processor is further configured to receive a user input from a user in one of the plurality of geographic regions comprising a search query for a collection of images, submit a search request comprising the search query to a search engine for the collection of images, receive an identification of the plurality of images from the collection of images that are responsive to the search query, and provide a listing of the plurality of images that is prioritized according to the one of the plurality of geographic regions of the user. In these aspects, the providing the first set of training images and the providing the second set of training images can occur prior to the receiving the user input comprising the search query and prior to the submitting the plurality of images to the computer-operated convolutional neural network. In these aspects, the processor can be further configured to provide, to the convolutional neural network with the plurality of images, information about images previously downloaded by the user, wherein the download probability of each image includes a download probability that is specific to the user and based on the one of the plurality of geographic regions of the user and the information about images previously downloaded by the user.

In certain aspects of the system, the processor is further configured to receive a user input from a user in one of the plurality of geographic regions comprising a search query for the plurality of images, submit a search request comprising the search query to a search engine for the plurality of images, receive an identification of a subset of the plurality of images from the collection of images that are responsive to the search query, identify the download probabilities for the subset of the plurality of images from the download probabilities for the plurality of images, and provide a listing of the subset of the plurality of images that is prioritized according to the one of the plurality of geographic regions of the user.

In certain aspects of the system, the processor is further configured to provide to the convolutional neural network an image that does not have associated regional download data identifying a number of downloads of the image in a geographic region, and receive from the convolutional neural network, a download probability of the image for each of the plurality of geographic regions. In certain aspects of the system, the convolutional neural network includes one of AlexNet, GoogLeNet, or a Visual Geometry Group convolutional neural network.

According to one embodiment of the present disclosure, a non-transitory machine-readable storage medium is provided including machine-readable instructions for causing a processor to execute a method for prioritizing a set of images identified as responsive to an image search query from a user based on features of the images identified as relevant to a geographic region of the user. The method includes providing a first set of training images to a convolutional neural network, wherein upon processing the first set of training images the convolutional neural network is configured to identify features from an image by analyzing pixel data of the image, and providing a second set of training images to the convolutional neural network and regional download data identifying a number of downloads of each of the second set of training images in each of a plurality of geographic regions, wherein upon processing the second set of training images and the regional download data the convolutional neural network is configured to analyze image pixel data for images to identify features, in each of the images, influencing the download probability of the corresponding image in the plurality of geographic regions. The method also includes submitting a plurality of images to the computer-operated convolutional neural network, and receiving, from the neural network and for each of the plurality of images, a download probability of each image for each of the plurality of geographic regions.

In certain aspects of the non-transitory machine-readable storage medium, the method further includes receiving a user input from a user in one of the plurality of geographic regions comprising a search query for a collection of images, submitting a search request comprising the search query to a search engine for the collection of images, receiving an identification of the plurality of images from the collection of images that are responsive to the search query, and providing a listing of the plurality of images that is prioritized according to the one of the plurality of geographic regions of the user. In these aspects, the method can further include providing, to the convolutional neural network with the plurality of images, information about images previously downloaded by the user, wherein the download probability of each image includes a download probability that is specific to the user and based on the one of the plurality of geographic regions of the user and the information about images previously downloaded by the user.

In certain aspects of the non-transitory machine-readable storage medium, the method further includes receiving a user input from a user in one of the plurality of geographic regions comprising a search query for the plurality of images, submitting a search request comprising the search query to a search engine for the plurality of images, receiving an identification of a subset of the plurality of images from the collection of images that are responsive to the search query, identifying the download probabilities for the subset of the plurality of images from the download probabilities for the plurality of images, and providing a listing of the subset of the plurality of images that is prioritized according to the one of the plurality of geographic regions of the user.

In certain aspects of the non-transitory machine-readable storage medium, the method further includes providing to the convolutional neural network an image that does not have associated regional download data identifying a number of downloads of the image in a geographic region, and receiving from the convolutional neural network, a download probability of the image for each of the plurality of geographic regions.

According to one embodiment of the present disclosure, a system is provided for prioritizing a set of images identified as responsive to an image search query from a user based on features of the images identified as relevant to a geographic region of the user. The system includes means for providing a first set of training images to a convolutional neural network, wherein upon processing the first set of training images the convolutional neural network is configured to identify features from an image by analyzing pixel data of the image, and for providing a second set of training images to the convolutional neural network and regional download data identifying a number of downloads of each of the second set of training images in each of the plurality of geographic regions, wherein upon processing the second set of training images and the regional download data the convolutional neural network is configured to analyze image pixel data for each of a plurality of images to identify features, in each of the plurality of images, influencing download probability of the corresponding image in the plurality of geographic regions. The means for providing further submits the plurality of images to the convolutional neural network, and receives, from the neural network and for each of the plurality of images, a download probability of each image for each of the plurality of geographic regions.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 6A-6C are example illustrations of prioritizing a set of images identified as responsive to an image search query "flags" from users from different geographic regions based on features of the images identified as relevant to those geographic regions of the users.

DETAILED DESCRIPTION

Figure 1:
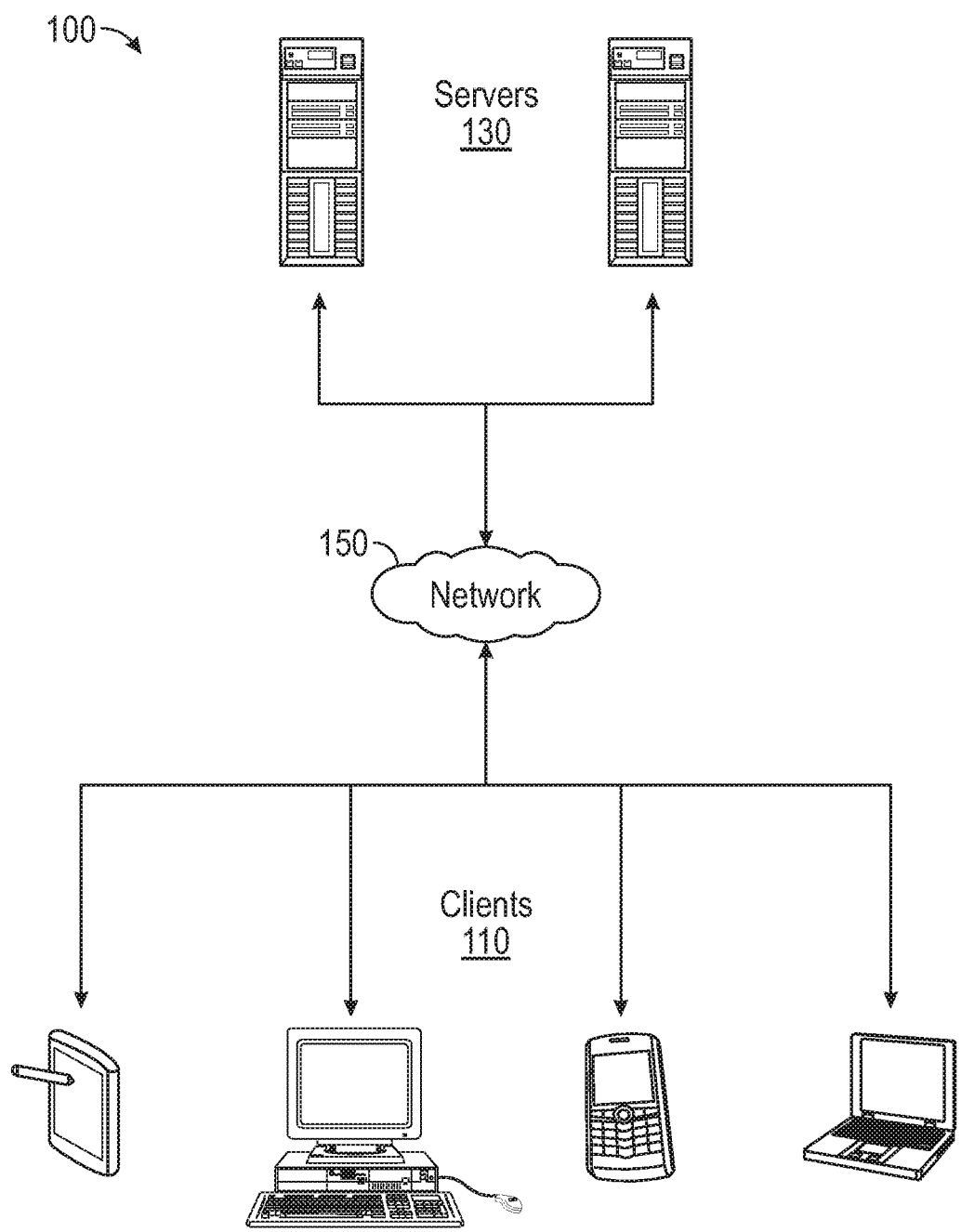
FIG. 1 illustrates an example architecture for prioritizing a set of images identified as responsive to an image search query from a user based on features of the images identified as relevant to a geographic region of the user.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail to avoid obscuring the disclosure.

There is a problem with current image search engines in that users from different geographical regions intending to search for different images but submitting identical queries will receive identical results. For example, a user using a device identified as being located in the United States or Canada that enters "football" will likely be searching for images related to the sport more particularly known as American football, while a user using a device identified as being located in Belize will likely be searching for images related to the sport referred to in the United States as soccer. Nonetheless, when both users submit an image search query for "football", they will commonly see an identical set of image search results.

The disclosed system addresses this problem specifically arising in the realm of computer technology by providing a solution also rooted in computer technology, namely, by the training of a computer-operated neural network, such as a convolutional neural network, to teach the neural network to identify features in images that would appear to influence the download probability of those images in different geographical regions. In certain aspects, the convolutional neural network is operated on a server and accesses large amounts of image data stored in memory of the server or stored elsewhere and accessible by the server in order to train the convolutional neural network. For example, a first set of images may be provided to the convolutional neural network in order to teach the convolutional neural network to automatically identify a hierarchy of low-level, mid-level and high-level features of images like corners, edges, blobs, etc. Features of an image include shapes and points, such as pentagons on a soccer ball, points on an American football, stars and colors on the United States flag, and the relationships between those elements. Next, after the convolutional neural network has learned to identify features in images, a second set of images along with a count, by geographical regions, of how many times those images were downloaded is provided to the convolutional neural network to teach the convolutional neural network to predict which features of the images correlated to a download frequency of images with those features in the different geographical regions.

Once the convolutional neural network has been trained to predict which features of the images correlate to a download frequency of images with those features in the different geographical regions, one or many new images (e.g., without historical download data) can be provided to the convolutional neural network to generate a probability, for each image, of likelihood that image would be downloaded in different geographical regions. Thus, when a user using a device identified as being located in Belize enters the image search query "football", the further trained convolutional neural network will identify images prioritizing the sport referred to in the United States as soccer but known elsewhere as football.

The proposed solution further provides improvements to the functioning of the computer itself because it saves data storage space and reduces network usage. Specifically, the computer hosting the collection of images to be searched is not required to maintain data storage or repeatedly share over a network with the convolutional neural network historic download information based on geographic region for the images to be searched because the convolutional neural network, once trained, is configured to predict which features of the images correlated to a download frequency of images with those features in the different geographical regions without this information.

Although many examples provided herein describe a user's device location being identifiable, or download history for images by geographic regions of users being stored, each user must grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

FIG. 1 illustrates an example architecture 100 for prioritizing a set of images identified as responsive to an image search query from a user based on features of the images identified as relevant to a geographic region of the user. The architecture 100 includes servers 130 and clients 110 connected over a network 150.

One of the many servers 130 is configured to host a computer-operated neural network. The neural network, which can be a convolutional neural network, is trained to identify features in images influencing download probabilities of the images in different geographic regions. One of the many servers 130 also hosts a collection of images. The collection of images can be searched using an image search engine (e.g., accessible through a web page on one of the clients 110). Images from the collection can also be used to train the neural network to identify features of images and, with additional data indicating in which geographic regions the images have been downloaded in the past, to identify which features, once identified, are likely to indicate that the corresponding image is more likely to be downloaded in a certain geographic region. For purposes of load balancing, multiple servers 130 can host the neural network and multiples servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
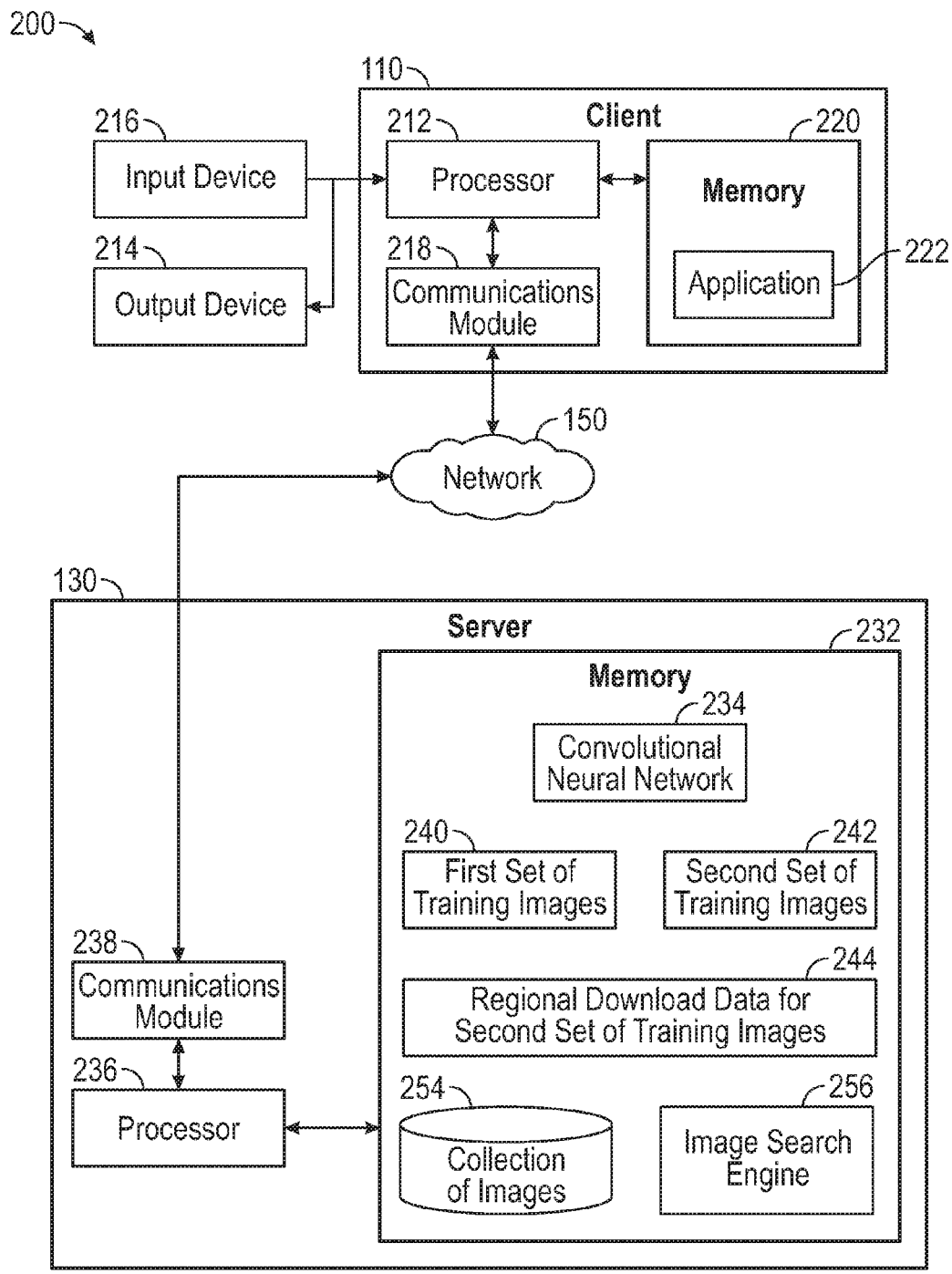
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232. The memory 232 of the server 130 includes a convolutional neural network 234. As discussed herein, a convolutional neural network 234 is a type of feed-forward artificial neural network where individual neurons are tiled in such a way that the individual neurons respond to overlapping regions in a visual field. The convolutional neural network 234 can be, for example, AlexNet, GoogLeNet, or a Visual Geometry Group convolutional neural network. In certain aspects, the convolutional neural network 234 consists of a stack of convolutional layers followed by several fully connected layers. The convolutional neural network 234 includes a loss layer (e.g., softmax or hinge loss layer) to back propagate errors so that the convolutional neural network 234 learns and adjusts its weights to better fit provided image data.

The memory also includes a collection of images 254 and an image search engine 256 for searching the collection of images 254. Also included in the memory 232 of the server 130 is a first set of training images 240, a second set of training images 242, and regional download data for the second set of training images 244. The regional download data for the second set of training images 244 includes a count of a number of times each of the second set of training images 242 was downloaded by a user in a particular geographic region. As discussed herein, a user downloading an image in a particular geographic region in certain aspects more specifically refers to the image being downloaded by a user device that is identified as being located in a particular geographic region at the time of download of the image.

The first set of training images 240 can be, for example, a dataset of images consisting of 8497 classes with around 1000 images per class. The classes can correspond to search terms having the highest number of downloads and their corresponding top 1000 popular images. The second set of training images 242 and associated regional download data 244 can be one million images (e.g., one million most downloaded images) identified from regional download data for the past six months with their associated geographic regional download counts. Although the first set of training images 240 and the second set of training images 242 are illustrated as being separate from the collection of images 254, in certain aspects the first set of training images 240 and the second set of training images 242 are a subset of the collection of images 254. Furthermore, although the collection of images 254 and the image search engine 256 are illustrated as being in the same memory 232 of a server 130 as the convolutional neural network 234, in certain aspects the collection of images 254 and the image search engine 256 can be hosted in a memory of a different server but accessible by the server 130 illustrated in FIG. 2.

The processor 236 of the server 130 is configured to execute instructions, such as instructions physically coded into the processor 236, instructions received from software in memory 240, or a combination of both. For example, the processor 236 of the server 130 executes instructions to submit a plurality of images to the convolutional neural network 234 that is configured to analyze image pixel data for each of the plurality of images to identify features, in each of the plurality of images, influencing a download probability of the corresponding image in a plurality of geographic regions and receive, from the neural network 234 and for each of the plurality of images, a download probability of each image for each of the plurality of geographic regions.

In certain aspects, the plurality of images submitted to the neural network 234 are identified in response to a search query. Specifically, in certain aspects, the processor 236 of the server 130 is configured to receive a user input from a user in one of a plurality of geographic regions. The user input is a search query (e.g., for the image search engine 256) for the collection of images 254. The user input is received, for example, by the user accessing the image search engine 256 over the network 150 using an application 222 in memory 220 on a client 110 of the user, and the user submitting the input using an input device 216 of the client 110. In response to the user input for the search query, a processor of the client 110 is configured to transmit the search query over the network 150 using the communications module 218 of the client 110 to the communications module 238 of the server 130.

The processor 236 of the server 130, upon receiving the search query for the image search engine 256, is configured to submit the search request for the search query to the image search engine 256. The processor 236 then receives an identification of the plurality of images from the collection of images 254 that are responsive to the search query, and is configured to provide a listing of the plurality of images that is prioritized according to the geographic region of the user. The listing of the plurality of images that is prioritized according to the geographic region of the user is provided, for example, by the processor 236 of the server 130 being configured to submitting the plurality of images that are responsive to the search query to the convolutional neural network 234, and the convolutional neural network 234 providing download probability values for each image of the plurality of images according to the geographic region of the user. The processor 236 may then prioritize the listing of the plurality of images according to the provided download probability values, and provide the listing to the application 222 on the client 110 over the network 150 for display by an output device 214 of the client 110.

In certain aspects, the convolutional neural network 234 is trained using a two-step approach. In a first step, the processor 236 of the server 130 is configured to provide the first set of training images 240 to the convolutional neural network 234. Upon processing the first set of training images 240 the convolutional neural network 234 is configured to identify features from an image by analyzing pixel data of the image. Features of an image include shapes and points, such as pentagons on a soccer ball, points on an American football, stars and colors on the United States flag, and the relationships between those elements. Features are learned by the convolutional neural network 234 from image data rather than being specified by a user. After initial training of the convolutional neural network 234, the features are summarized by the convolutional neural network 234 into a feature vector that captures the feature information in a distributed representation. In certain aspects, features can be a hierarchy of representations with increasing levels of abstraction, such as pixel, then corner/edge, then texton, then motif part, and then object. The processor 236 of the server 130 is also configured to provide to the convolutional neural network 234 the second set of training images 242 and the regional download data for the second set of training images 244. Upon processing the second set of training images 242 and the regional download data 244 the convolutional neural network 234 is configured to analyze image pixel data for images to identify features, in each of the images, which influence the download probability of the corresponding image in different geographic regions. Once trained, the convolutional neural network 234 is configured to analyze pixel data for a newly provided image to identify features in the image that influence the download probability of the image in different geographic regions. Thus, the processor 236 of the server 130 is configured to provide to the convolutional neural network 234 an image that does not have associated regional download data identifying a number of downloads of the image in a geographic region, and receive, from the convolutional neural network 234, a download probability of the image for a plurality of geographic regions. The training of the convolutional neural network 234 can occur prior to the user input for the search query and prior to the submitting the plurality of images to the convolutional neural network 234, so that the convolutional neural network 234 is appropriately configured to provide the download probability values for each image of the plurality of images according to the geographic region of the user.

In certain aspects, in order to provide download probability values for images that are more specific to a particular user, the processor 236 of the server 130 is configured to provide to the convolutional neural network 234, along with the plurality of images that are responsive to the search query, information about images that were previously downloaded, such as within the last six months. In certain aspects, this information could be the most recently available information, such as, for example, the latest one million downloaded images and the corresponding country of download pairs. The convolutional neural network 234 may then, based on the information about images previously downloaded by the user, provide a download probability for each image that is specific to the user because the download probability is based on the geographic region of the user and the information about images previously downloaded by the user.

In certain aspects, the plurality of images that are responsive to the search query of the user do not have associated geographical region download probability values prior to receipt of the search query of the user, but are instead submitted to the convolutional neural network 234 after being identified as being responsive to the search query of the user in order to identify their associated geographical region download probability values.

In certain other aspects, however, the collection of images 254 from which the plurality of images responsive to the search query of the user are identified each have associated geographical region download probability values prior to receipt of the search query of the user because each image in the collection of images 254 has previously been submitted to the convolutional neural network 234 to obtain its associated geographical region download probability values. This is done in order to avoid the step of submitting the plurality of images to the convolutional neural network 234 after receipt of the search query of the user and thereby more quickly provide the download probability values for each image of the plurality of images according to the geographic region of the user. Specifically, this is accomplished where the processor 236 of the server 130 is configured to receive the user input for the search query for the plurality of images, submit a search request for the search query to the image search engine 256, receive the identification of a subset of the plurality of images from the collection of images that are responsive to the search query, and identify the download probabilities for the subset of the plurality of images from the download probabilities for the plurality of images (which were obtained prior to receipt of the search query when each image in the collection of images 254 was previously submitted to the convolutional neural network 234 to obtain its associated geographical region download probability values).

Figure 3:
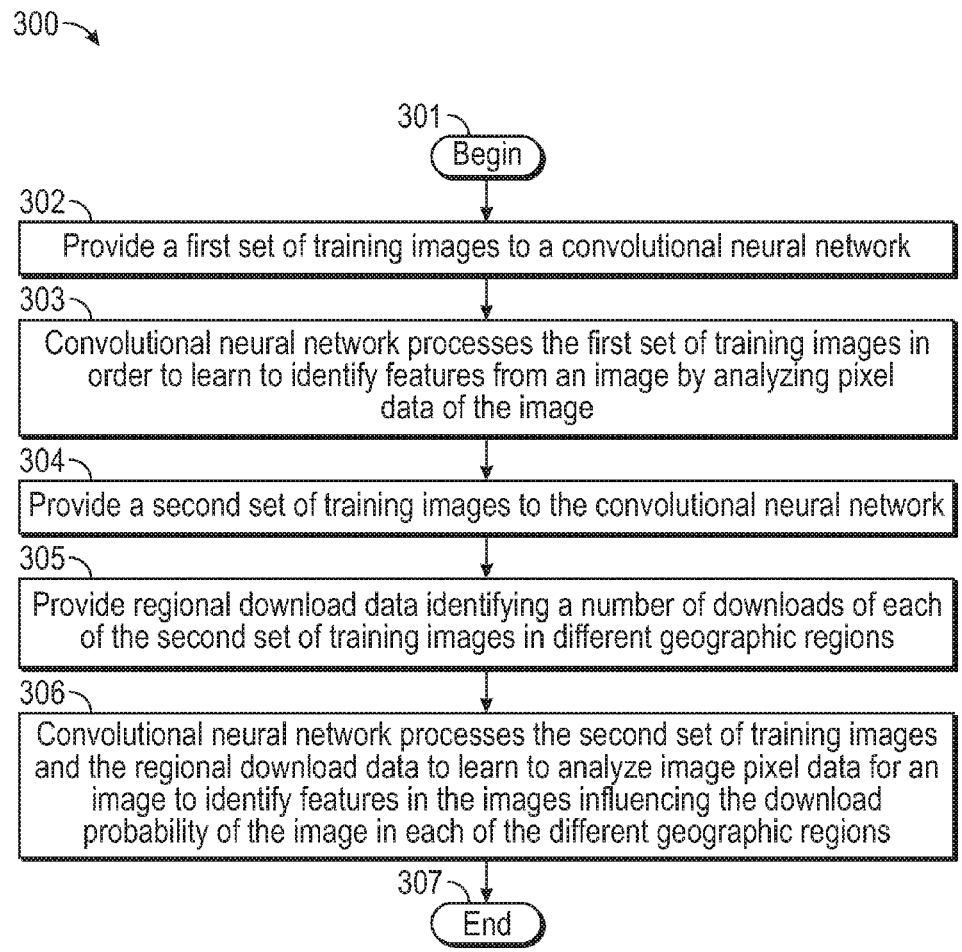
FIG. 3 illustrates an example process for training a convolutional neural network to analyze image pixel data to identify features in an image influencing a download probability of the image in different geographic regions using the example server of FIG. 2.

FIG. 3 illustrates an example process 300 for training a convolutional neural network 234 to analyze image pixel data to identify features in an image influencing a download probability of the image in different geographic regions using the example server 130 of FIG. 2. While FIG. 3 is described with reference to FIG. 2, it should be noted that the process steps of FIG. 3 may be performed by other systems.

The process 300 begins by proceeding from beginning step 301 to step 302 when a first set of training images 240 are provided to a convolutional neural network 234. The first set of training images 240 can be, for example, images that were previously downloaded from the collection of images 254 by a user. This first set of images can correspond to, for example, search terms with a highest number of downloads from the collection of images 254 and their corresponding top one thousand popular images as returned by the current search query. For example, the convolutional neural network 234 can consist of a stack of eight layers with weights, the first five layers being convolutional layers and the remaining three layers being fully-connected layers. The first set of training images 240 can be fixed-size 256×256 pixel Red-Green-Blue (RGB) images, taking multiple 227×227 pixel crops of the image and feeding the cropped images through the convolutional neural network 234. In certain aspects, pre-processing may take place where a mean RGB value is subtracted from each pixel of each image and computed on the first set of training images 240. The batch size for the first set of training images 240 may be set to 128 (i.e., 128 total images in the first set of training images 240) and the momentum may be set to 0.9. The momentum can facilitate the convolutional neural network 234 to come out of local minima by adding a fraction m of the previous weight update to the current weight. Thus, when a gradient points in a same direction, the momentum will increase the size of the steps taken towards the minimum. It is therefore helpful to reduce a global learning rate when using significant momentum (e.g., m close to 1).

Next, in step 303, the convolutional neural network 234 processes the first set of training images 240 in order to learn to identify features from an image by analyzing pixel data of the image. Training with the first set of training images 240 may be regularized by weight decay (e.g., reducing the size of all weight to prevent the convolutional neural network 234 from focusing too much on any single feature of an image) and dropout regularization (e.g., randomly zeroing features so that the convolutional neural network 234 does not rely too much on combinations of features that are a coincidence) for the first two fully-connected layers with a dropout ratio (e.g., a proportion of values set to zero in each training step) set to 0.5, and the learning rate (e.g., the optimism/confidence in new data versus the model trained so far) may initially be set to $10^{-2}$ and then decreased by a factor of 10 when validation set accuracy stops improving for the convolutional neural network 234. Weight decay can be a regularization method, and an additional term in a weight update rule can causes the weights to exponentially decay to zero if no other update is scheduled. During each weight update, weight decay scales weights down in proportion to their current size. By decaying all weights, any weights that are not being used by the convolutional neural network 234 to produce meaningful output may become negligible, rather than persisting in the network for no reason.

Dropout is an additional regularization method that works by choosing a probability p (commonly p=0.5), and randomly dropping units (along with their connections) from the convolutional neural network 234 during training time. At test time, no nodes are dropped out, so in order to compensate for the increase in layer output caused by all nodes being active, rather than a subset, the weights may all multiplied by 1−p. Dropout helps prevent overfitting by not allowing neurons to co-adapt to each other. Because a neuron cannot count on any other neuron to be active during any particular training iteration, the neuron must learn to receive inputs generally, rather than specifically. The learning rate is a parameter that determines how much an updating step influences the current value of the weights. If a learning rate is large there will be a large modification of the weights. The learning rate should thus not be too large, otherwise it may overshoot the local minimum in a cost function. On the other hand, if the learning rate is too low, the convolutional neural network 234 will take significant time to converge to minima.

Returning to the process 300, in step 304, a second set of training images 304 is provided to the convolutional neural network 234, and in step 305 regional download data 244 is provided to the convolutional neural network 234 identifying a number of downloads of each of the second set of training images 242 in different geographic regions. The second set of training images 242 can be a selection of the most downloaded images for the different geographic regions. In certain aspects, the second set of images were simply the latest 1 million images downloaded with the corresponding country of download info. In step 306, the convolutional neural network 234 processes the second set of training images 242 and the regional download data 244 to learn to analyze image pixel data for an image to identify features in the images influencing the download probability of the image in each of the different geographic regions. For example, for each image-geographic region pair, the features extracted using the model generated by the convolutional neural network 234 as trained in step 303 is implemented with three fully connected layers of the convolutional neural network 234. The third fully connected layer maps an image to one of the many geographic regions, and loss layer (e.g., a softmax loss) may be implemented to back propagate errors. As another example, for each image from the second set of training images 304 features that are identifiable from step 303 are extracted from the image. The extracted features are then fed into a multinomial logistic regression to map them to their respective geographic regions of download (e.g., from the regional download data 244). In certain aspects, step 306 takes less time than step 303 as it starts from the features generated by step 303 and the convolutional neural network 234 is limited to three layers leaving fewer weights for the convolutional neural network 234 to learn. As a result, after step 306, the convolutional neural network 234 provides a trained model specialized to understand and identify features in images most important to visual tastes of a geographic region. The process 300 ends in step 307.

Figure 4:
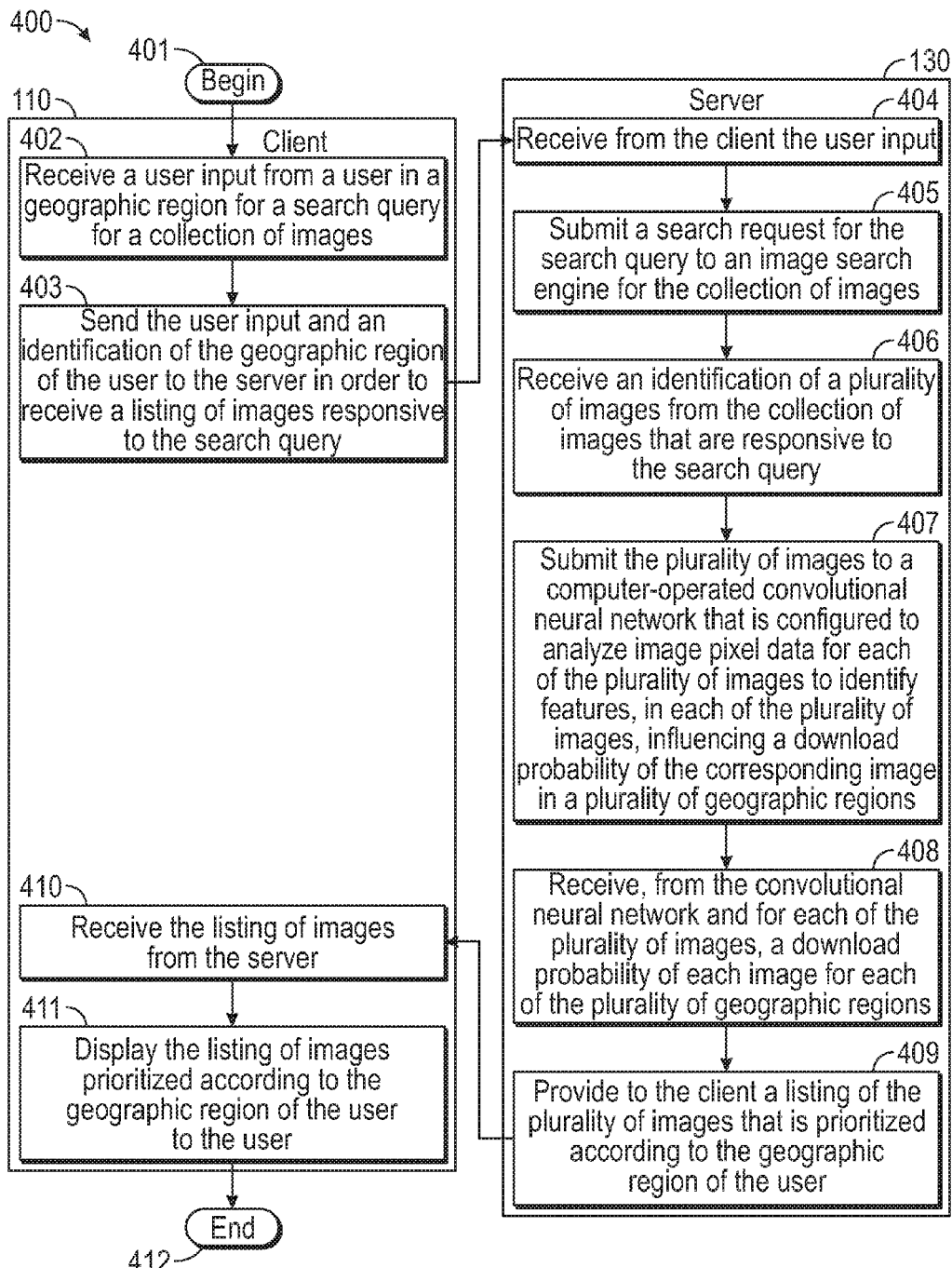
FIG. 4 illustrates an example process for prioritizing a set of images identified as responsive to an image search query from a user based on features of the images identified as relevant to a geographic region of the user using the example client and server of FIG. 2.

FIG. 4 illustrates an example process 400 for prioritizing a set of images identified as responsive to an image search query from a user based on features of the images identified as relevant to a geographic region of the user using the example client 110 and server 130 of FIG. 2. The process 400 begins in step 401 when a user, for example, loads an application 222 on a client 110 and proceeds to step 402 when the client 110 receives an input from the user using the input device 216 for a search query for a collection of images 254. The user is identified as being located in a particular geographic region based on the location of the client 110 as obtained by the application 222. Next, in step 403, the application 222 on the client 110 sends the user input and an identification of the geographic region of the user to the server 130 in order to receive a listing of images responsive to the search query.

Turning to the server 130, in step 404, the server 130 receives the user input for the search query for a collection of images from the client 110, and in step 405 submits a search request for the search query to an image search engine 256 for the collection of images 254. Next, in step 406, an identification of a plurality of images from the collection of images 254 that are responsive to the search query is received, and in step 407 the plurality of images are submitted to a computer-operated convolutional neural network 234 that is configured to analyze image pixel data for each of the plurality of images to identify features, in each of the plurality of images, influencing a download probability of the corresponding image in a plurality of geographic regions. Subsequently, in step 408, a download probability of each image is received from the convolutional neural network 234 for each of the plurality of geographic regions, and in step 409 the server 130 provides the client 110 with a listing of the plurality of images that is prioritized according to the geographic region of the user.

FIG. 4 set forth an example process 400 for prioritizing a set of images identified as responsive to an image search query from a user based on features of the images identified as relevant to a geographic region of the user using the example client 110 and server 130 of FIG. 2. An example will now be described using the example process 300 of FIG. 3, an application 222 that is a web browser, and a client 110 that is a desktop computer located in the United States.

The process 400 begins in step 401 when a user loads a web page for an image search engine 256 in a web browser application 222 on the user's desktop computer client 110 located in the United States, and proceeds to step 402 when the desktop computer client 110 receives an input from the user for an image search query "tap" in the collection of images 254. Next, in step 403, the web browser application 222 on the client 110 sends the image search query "tap" and an identification of the user as being located in the United States to the server 130 in order to receive a listing of images responsive to the search query.

Turning to the server 130, in step 404, the server 130 receives the United States origin image search query for "tap" from the desktop computer client 110, and in step 405 submits a search request for the search query to the image search engine 256 for the collection of images 254 that does not take into consideration the geographic origin of the image search query. Next, in step 406, an identification of a plurality of images from the collection of images 254 that are responsive to the image search query for "tap" is received, the "tap" images not being prioritized or otherwise ordering according to any geographic region. In step 407 the "tap" images are submitted to a computer-operated convolutional neural network 234 that is configured to analyze image pixel data for each of the "tap" images to identify features, in each of the "tap" images, influencing a download probability of the corresponding image in different geographic regions that include the United States, India, Mexico, and Brazil, among other geographic regions.

Figure 5A:
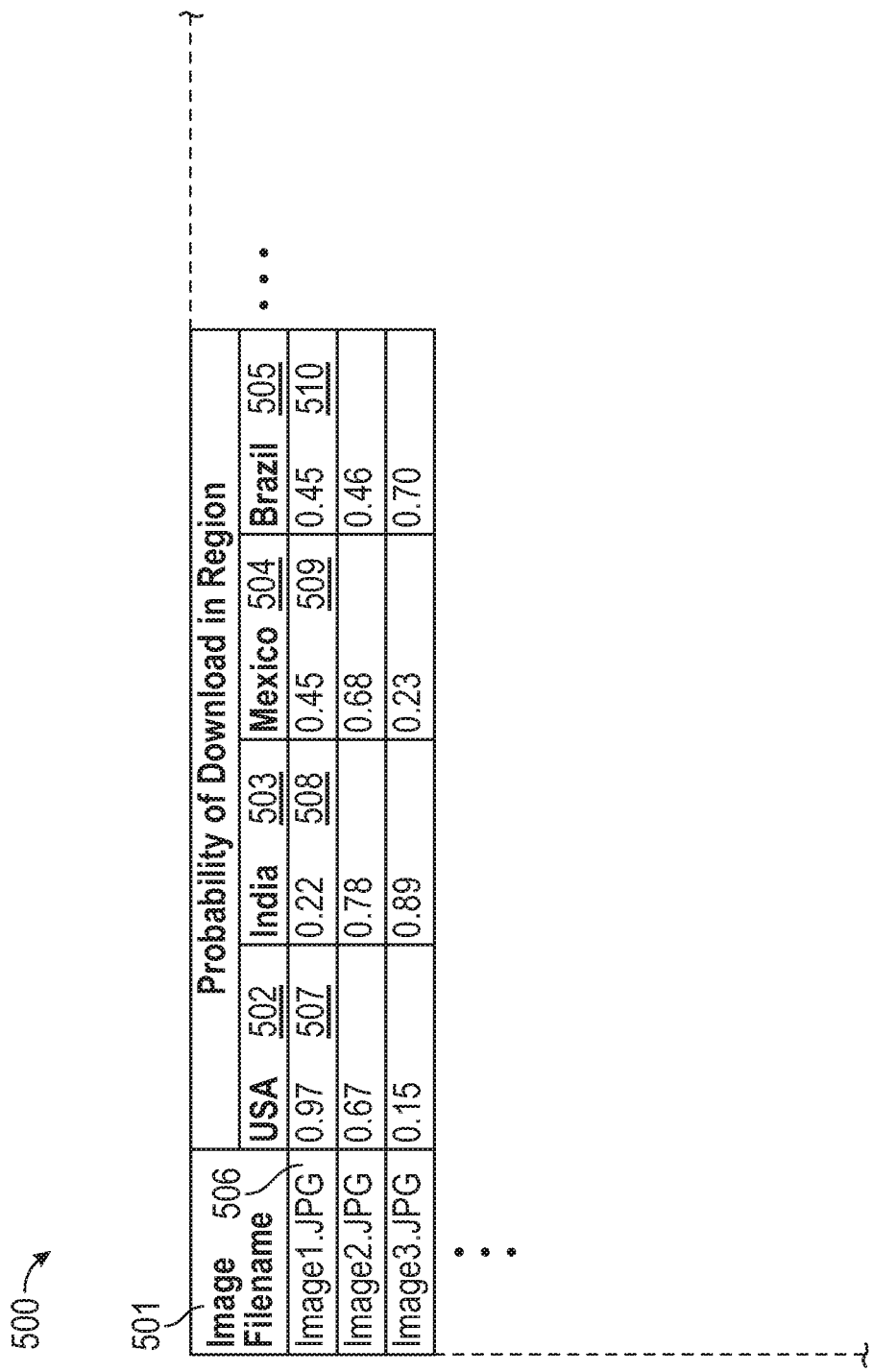
FIG. 5A is an example table of download probability values for different geographic regions for different images that are produced by an exemplary trained convolutional neural network as described herein.
Figure 5B:
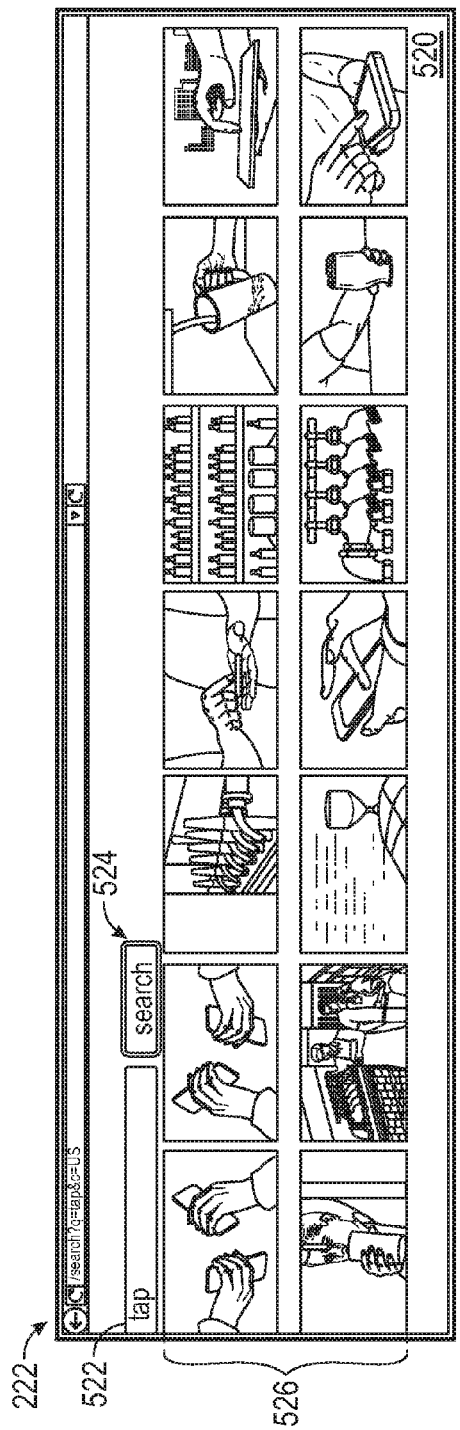
FIGS. 5B-5D are example illustrations of prioritizing a set of images identified as responsive to an image search query "tap" from users from different geographic regions based on features of the images identified as relevant to those geographic regions of the users corresponding to the table of FIG. 5A and associated with the example process of FIG. 3.
Figure 5C:
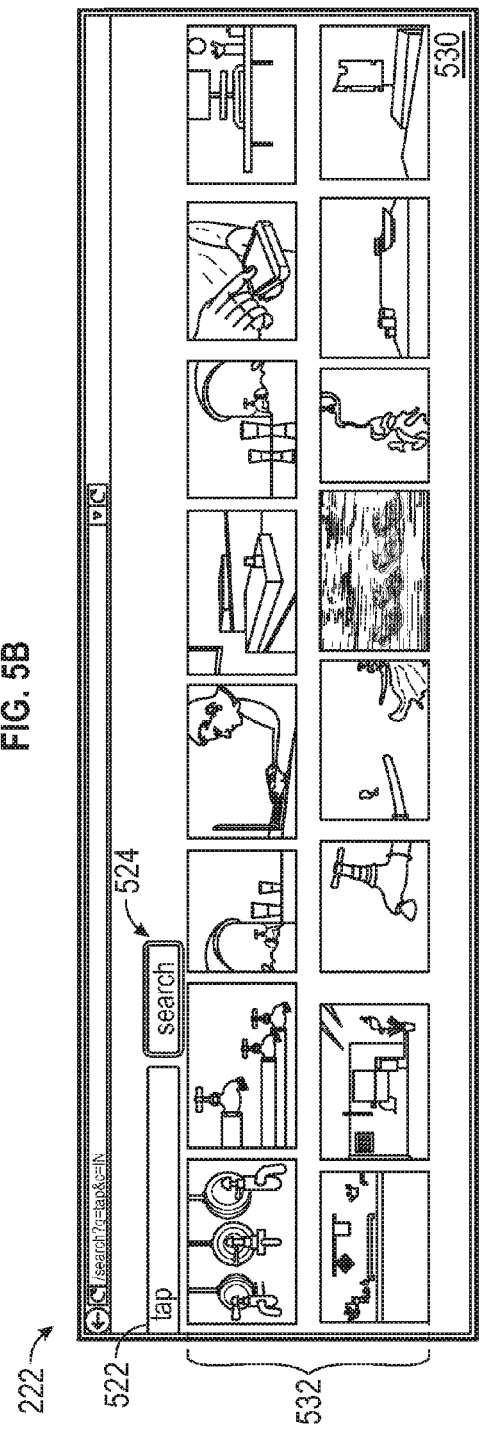
Figure 5D:
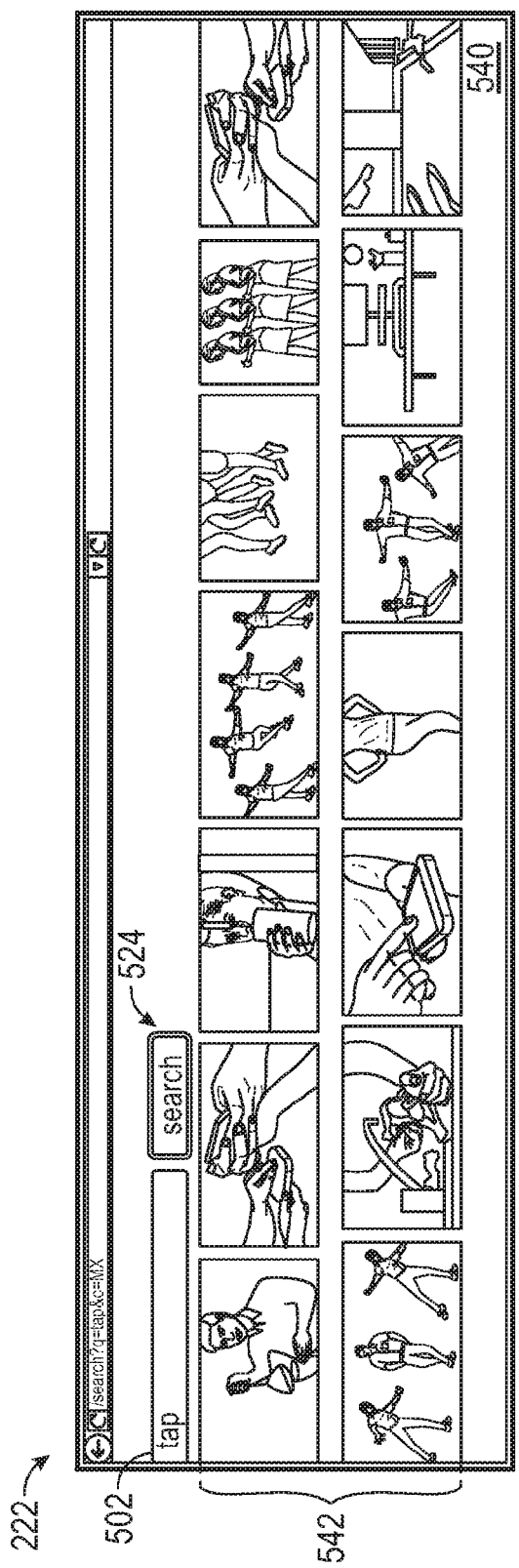

Subsequently, in step 408, a download probability of each "tap" image is received from the convolutional neural network 234 for each of the plurality of geographic regions. FIG. 5A is an example table 500 of download probability values for different geographic regions for different "tap" images that are produced by the convolutional neural network 234. The table 500 includes an identification of each "tap" image filename 501 and download probabilities for each image for the regions of the United States 502, India 503, Mexico 504, Brazil 505, and others (not illustrated). For example, for the first "tap" image identified as responsive to the image search query for "tap", "IMAGE1.JPG" 506, the download probability in the United States 507 is 0.97, in India 508 is 0.22, in Mexico 509 is 0.45, and in Brazil 505 is 0.45. In step 409, the server 130 provides the desktop computer client 110 with an address of a web page listing of the "tap" images that is prioritized according to the geographic region of the user, namely, the United States.

Figure 6C:
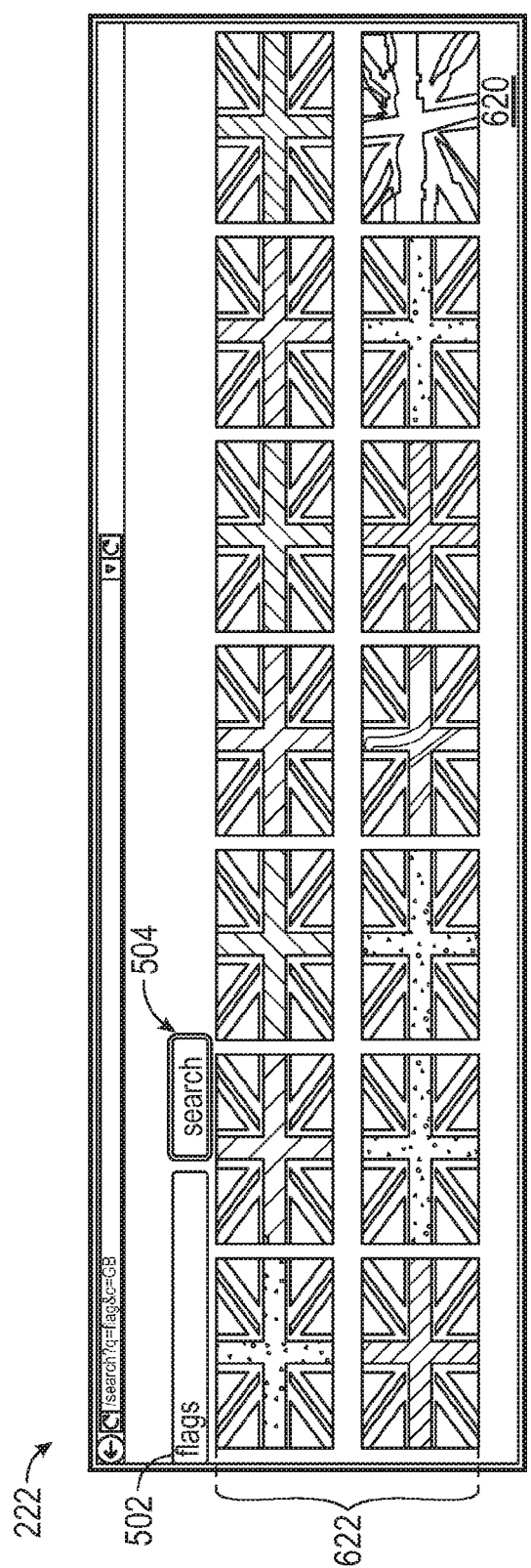

FIGS. 6A-6C are example illustrations of a prioritizing a set of images identified as responsive to an image search query "flags" from users from different geographic regions based on features of the images identified as relevant to those geographic regions of the users. Specifically, FIG. 6A provides an example illustration 600 of a prioritization for a listing of images 602 displayed in an application 222 responsive to an image search query for "flags" from a user identified as being located in Brazil. FIG. 6B provides an example illustration 610 of a prioritization for a listing of images 612 displayed in an application 222 responsive to an image search query for "flags" from a user identified as being located in the United States. FIG. 6C provides an example illustration 620 of a prioritization for a listing of images 622 displayed in an application 222 responsive to an image search query for "flags" from a user identified as being located in Great Britain.

Figure 7A:
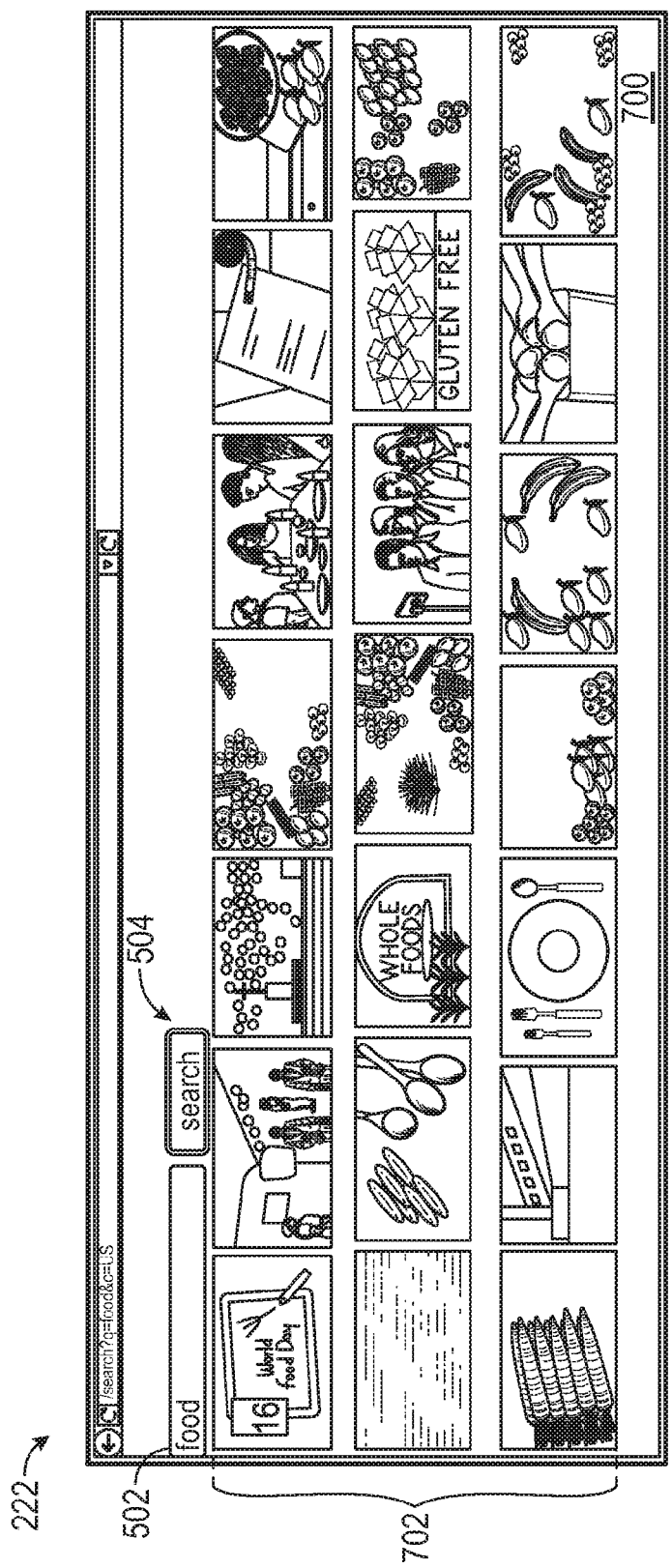
FIGS. 7A and 7B are example illustrations of a prioritizing a set of images identified as responsive to an image search query "food" from users from different geographic regions based on features of the images identified as relevant to those geographic regions of the users.
Figure 7B:
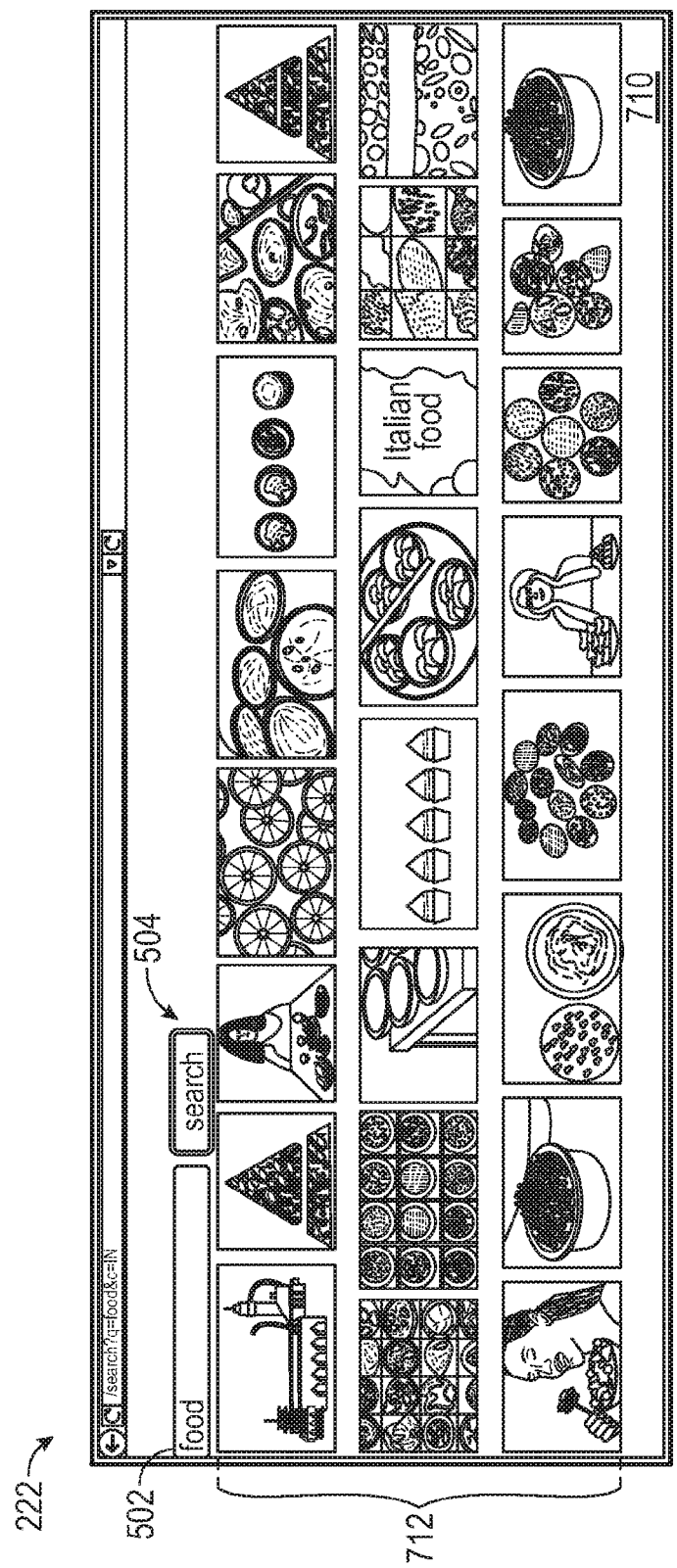

FIGS. 7A and 7B are example illustrations of a prioritizing a set of images identified as responsive to an image search query "food" from users from different geographic regions based on features of the images identified as relevant to those geographic regions of the users. Specifically, FIG. 7A provides an example illustration 700 of a prioritization for a listing of images 702 displayed in an application 222 responsive to an image search query for "food" from a user identified as being located in the United States. FIG. 7B provides an example illustration 710 of a prioritization for a listing of images 712 displayed in an application 222 responsive to an image search query for "food" from a user identified as being located in India.

Figure 8:
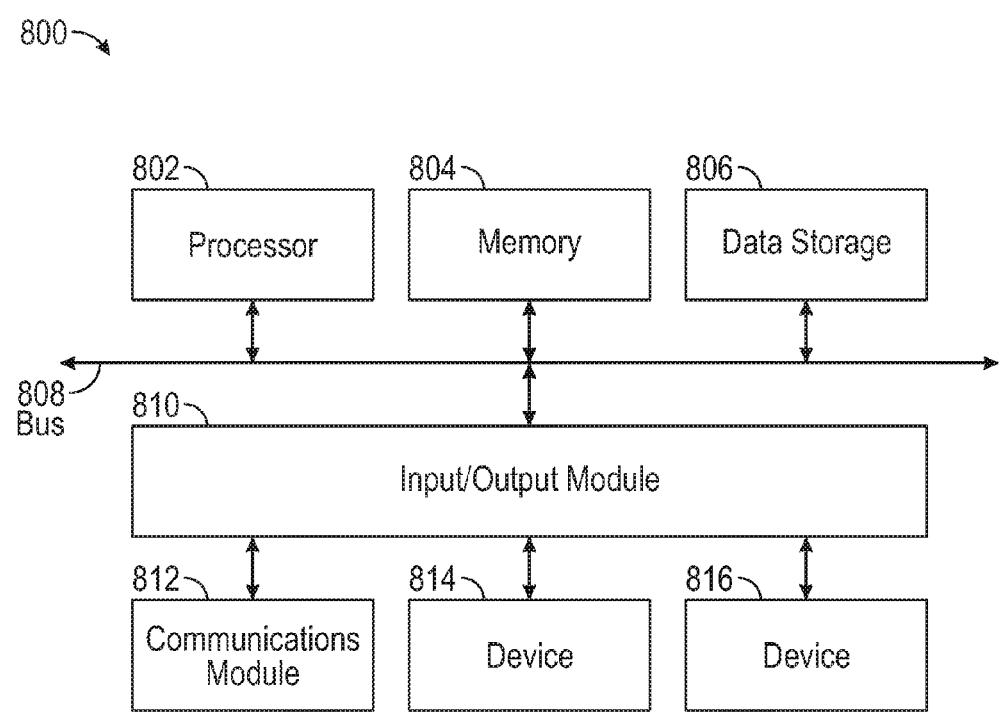
FIG. 8 is a block diagram illustrating an example computer system with which the client and server of FIG. 2 can be implemented.

FIG. 8 is a block diagram illustrating an example computer system 800 with which the client 110 and server 130 of FIG. 2A can be implemented. In certain aspects, the computer system 800 may be implemented using hardware or a combination of software and hardware, either in a dedicated server, or integrated into another entity, or distributed across multiple entities.

FIG. 8 is a block diagram illustrating an exemplary computer system 800 with which the client 110 and server 130 of FIG. 2 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processor 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, the input/output module 810 is configured to connect to a plurality of devices, such as an input device 814 (e.g., input device 216) and/or an output device 816 (e.g., output device 214). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a CRT (cathode ray tube) or LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:
1. A computer-implemented method for prioritizing a set of images identified as responsive to an image search query from a user based on features of the images identified as relevant to a geographic region of the user, the method comprising:

submitting a plurality of images to a computer-operated convolutional neural network that is configured to analyze image pixel data for each of the plurality of images to identify features, in each of the plurality of images, influencing a download probability of the corresponding image in a plurality of geographic regions; and receiving, from the neural network and for each of the plurality of images, a download probability of each image for each of the plurality of geographic regions.

2. The method of claim 1, further comprising:

receiving a user input from a user in one of the plurality of geographic regions comprising a search query for a collection of images;

submitting a search request comprising the search query to a search engine for the collection of images;

receiving an identification of the plurality of images from the collection of images that are responsive to the search query; and providing a listing of the plurality of images that is prioritized according to the one of the plurality of geographic regions of the user.

3. The method of claim 2, further comprising:

providing a first set of training images to the convolutional neural network, wherein upon processing the first set of training images the convolutional neural network is configured to identify features from an image by analyzing pixel data of the image; and providing a second set of training images to the convolutional neural network and regional download data identifying a number of downloads of each of the second set of training images in each of the plurality of geographic regions, wherein upon processing the second set of training images and the regional download data the convolutional neural network is configured to analyze image pixel data for each of the plurality of images to identify features, in each of the plurality of images, influencing the download probability of the corresponding image in the plurality of geographic regions.

4. The method of claim 3, wherein the providing the first set of training images and the providing the second set of training images occurs prior to the receiving the user input comprising the search query and prior to the submitting the plurality of images to the computer-operated convolutional neural network.

5. The method of claim 2, further comprising:

providing, to the convolutional neural network with the plurality of images, information about images previously downloaded by the user, wherein the download probability of each image comprises a download probability that is specific to the user and based on the one of the plurality of geographic regions of the user and the information about images previously downloaded by the user.

6. The method of claim 1, further comprising:

receiving a user input from a user in one of the plurality of geographic regions comprising a search query for the plurality of images;

submitting a search request comprising the search query to a search engine for the plurality of images;

receiving an identification of a subset of the plurality of images from the collection of images that are responsive to the search query;

identifying the download probabilities for the subset of the plurality of images from the download probabilities for the plurality of images; and providing a listing of the subset of the plurality of images that is prioritized according to the one of the plurality of geographic regions of the user.

7. The method of claim 1, further comprising:

providing to the convolutional neural network an image that does not have associated regional download data identifying a number of downloads of the image in a geographic region; and receiving from the convolutional neural network, a download probability of the image for each of the plurality of geographic regions.

8. A system for prioritizing a set of images identified as responsive to an image search query from a user based on features of the images identified as relevant to a geographic region of the user, the system comprising:

a memory comprising:

a first set of training images;

a second set of training images;

regional download data identifying a number of downloads of each of the second set of training images in each of the plurality of geographic regions; and a computer-operated convolutional neural network; and a processor configured to:

provide the first set of training images to the convolutional neural network, wherein upon processing the first set of training images the convolutional neural network is configured to identify features from an image by analyzing pixel data of the image;

provide the second set of training images to the convolutional neural network and the regional download data identifying a number of downloads of each of the second set of training images in each of the plurality of geographic regions, wherein upon processing the second set of training images and the regional download data the convolutional neural network is configured to analyze image pixel data for each of a plurality of images to identify features, in each of the plurality of images, influencing download probability of the corresponding image in the plurality of geographic regions;

submit the plurality of images to the convolutional neural network; and receive, from the neural network and for each of the plurality of images, a download probability of each image for each of the plurality of geographic regions.

9. The system of claim 8, wherein the processor is further configured to:

receive a user input from a user in one of the plurality of geographic regions comprising a search query for a collection of images;

submit a search request comprising the search query to a search engine for the collection of images;

receive an identification of the plurality of images from the collection of images that are responsive to the search query; and provide a listing of the plurality of images that is prioritized according to the one of the plurality of geographic regions of the user.

10. The system of claim 9, wherein the providing the first set of training images and the providing the second set of training images occurs prior to the receiving the user input comprising the search query and prior to the submitting the plurality of images to the computer-operated convolutional neural network.

11. The system of claim 9, wherein the processor is further configured to:
provide, to the convolutional neural network with the plurality of images, information about images previously downloaded by the user,
wherein the download probability of each image comprises a download probability that is specific to the user and based on the one of the plurality of geographic regions of the user and the information about images previously downloaded by the user.

12. The system of claim 8, wherein the processor is further configured to:
receive a user input from a user in one of the plurality of geographic regions comprising a search query for the plurality of images;
submit a search request comprising the search query to a search engine for the plurality of images;
receive an identification of a subset of the plurality of images from the collection of images that are responsive to the search query;
identify the download probabilities for the subset of the plurality of images from the download probabilities for the plurality of images; and
provide a listing of the subset of the plurality of images that is prioritized according to the one of the plurality of geographic regions of the user.

13. The system of claim 8, wherein the processor is further configured to:
provide to the convolutional neural network an image that does not have associated regional download data identifying a number of downloads of the image in a geographic region; and
receive from the convolutional neural network, a download probability of the image for each of the plurality of geographic regions.

14. A non-transitory machine-readable storage medium comprising machine-readable instructions for causing a processor to execute a method for prioritizing a set of images identified as responsive to an image search query from a user based on features of the images identified as relevant to a geographic region of the user, comprising:
providing a first set of training images to a convolutional neural network, wherein upon processing the first set of training images the convolutional neural network is configured to identify features from an image by analyzing pixel data of the image;
providing a second set of training images to the convolutional neural network and regional download data identifying a number of downloads of each of the second set of training images in each of a plurality of geographic regions, wherein upon processing the second set of training images and the regional download data the convolutional neural network is configured to analyze image pixel data for images to identify features, in each of the images, influencing the download probability of the corresponding image in the plurality of geographic regions;
submitting a plurality of images to the computer-operated convolutional neural network; and
receiving, from the neural network and for each of the plurality of images, a download probability of each image for each of the plurality of geographic regions.

15. The non-transitory machine-readable storage medium of claim 14, further comprising:
receiving a user input from a user in one of the plurality of geographic regions comprising a search query for a collection of images;
submitting a search request comprising the search query to a search engine for the collection of images;
receiving an identification of the plurality of images from the collection of images that are responsive to the search query; and
providing a listing of the plurality of images that is prioritized according to the one of the plurality of geographic regions of the user.

16. The non-transitory machine-readable storage medium of claim 15, further comprising:
providing, to the convolutional neural network with the plurality of images, information about images previously downloaded by the user,
wherein the download probability of each image comprises a download probability that is specific to the user and based on the one of the plurality of geographic regions of the user and the information about images previously downloaded by the user.

17. The non-transitory machine-readable storage medium of claim 14, further comprising:
receiving a user input from a user in one of the plurality of geographic regions comprising a search query for the plurality of images;
submitting a search request comprising the search query to a search engine for the plurality of images;
receiving an identification of a subset of the plurality of images from the collection of images that are responsive to the search query;
identifying the download probabilities for the subset of the plurality of images from the download probabilities for the plurality of images; and
providing a listing of the subset of the plurality of images that is prioritized according to the one of the plurality of geographic regions of the user.

18. The non-transitory machine-readable storage medium of claim 14, further comprising:
providing to the convolutional neural network an image that does not have associated regional download data identifying a number of downloads of the image in a geographic region; and
receiving from the convolutional neural network, a download probability of the image for each of the plurality of geographic regions.

* * * * *